United States Patent
Hermann et al.

(10) Patent No.: US 12,523,375 B2
(45) Date of Patent: Jan. 13, 2026

(54) METHOD FOR THE FAILSAFE AND LEAN IGNITION OF A GAS-AIR MIXTURE ON A GAS BURNER

(71) Applicant: ebm-papst Landshut GmbH, Landshut (DE)

(72) Inventors: Jens Hermann, Landshut (DE); Bernhard Simon, Regensburg (DE)

(73) Assignee: ebm-papst Landshut GmbH, Landshut (DE)

(*) Notice: Subject to any disclaimer, the term of this patent is extended or adjusted under 35 U.S.C. 154(b) by 448 days.

(21) Appl. No.: 18/157,145

(22) Filed: Jan. 20, 2023

(65) Prior Publication Data
US 2023/0228418 A1    Jul. 20, 2023

(30) Foreign Application Priority Data
Jan. 20, 2022  (DE) ............ 10 2022 101 305.7

(51) Int. Cl.
*F23N 5/24* (2006.01)
*F23D 14/02* (2006.01)

(52) U.S. Cl.
CPC ............ *F23N 5/242* (2013.01); *F23D 14/02* (2013.01); *F23C 2900/9901* (2013.01); *F23N 2225/06* (2020.01); *F23N 2235/16* (2020.01); *F23N 2900/05181* (2013.01)

(58) Field of Classification Search
CPC .. F23N 5/242; F23N 2225/06; F23N 2235/16; F23D 14/02; F23C 2900/9901
USPC ............................................. 431/6
See application file for complete search history.

(56) References Cited

U.S. PATENT DOCUMENTS

| 4,573,348 A | * | 3/1986 | Abramson | ............ G01M 13/02 |
| | | | | 91/392 |
| 10,247,416 B2 | * | 4/2019 | Munsterhuis | ........... F23N 1/022 |
| 2017/0292698 A1 | * | 10/2017 | Langius | ................. F23N 5/126 |

FOREIGN PATENT DOCUMENTS

| DE | 19824521 A1 | 12/1999 |
| DE | 102011000113 A1 | 7/2012 |
| DE | 102018105185 A1 | 9/2019 |
| EP | 0315055 A1 | 5/1989 |
| EP | 1672280 A1 | 6/2006 |

OTHER PUBLICATIONS

German Search Report dated Jul. 1, 2022 in corresponding German Application No. 10 2022 101 305.7 (7 pages).

* cited by examiner

*Primary Examiner* — Avinash A Savani
(74) *Attorney, Agent, or Firm* — Harness, Dickey & Pierce, P.L.C.

(57) ABSTRACT

A method for the failsafe and lean ignition of a fuel gas-air mixture on a gas burner (6), which is mixed in a mixing device (4) arranged upstream of the gas burner (6). A control valve (2) along the fuel gas flow path has an actuator (21) and a throttle element (23), moved by the actuator (21), for the closed-loop control of a flow rate of the fuel gas flowing into the mixing device (4). A test is performed to determine whether the throttle element (23) is in the throttle reference position when the actuator (21) is in the actuator reference position. The throttle element (23) is moved in a flow rate-increasing manner starting at a start time (tD). The flow rate-increasing movement of the throttle element (23) is stopped as soon as at least one of multiple predetermined termination conditions occurs.

12 Claims, 1 Drawing Sheet

METHOD FOR THE FAILSAFE AND LEAN IGNITION OF A GAS-AIR MIXTURE ON A GAS BURNER

CROSS-REFERENCE TO RELATED APPLICATION

This application claims the benefit and priority of German Application No. 10 2022 101 305.7, filed Jan. 20, 2022. The entire disclosure of the above application is incorporated herein by reference.

FIELD

The disclosure relates to a method for the failsafe and lean ignition of a fuel gas-air mixture on a gas burner and, in particular, in the case of a heating boiler. The disclosure further relates to a heating boiler designed to carry out the method.

BACKGROUND

From the prior art, numerous heating or gas boilers with corresponding methods for the ignition of the fuel gas-air mixture in the gas burner of the boiler are known. The boilers are usually designed for combustion of natural gas.

As a rule, such heating boilers comprise a gas burner for combustion of the fuel gas-air mixture. A mixing device is arranged upstream of the gas burner for mixing a fuel gas flowing in along a fuel gas flow path and air flowing in along an air flow path. A control valve is arranged along the fuel gas flow path for the closed-loop control of a flow rate of the fuel gas flowing into the mixing device. A main quantity throttle is arranged along the fuel gas flow path between the control valve and the mixing device. A safety valve is arranged along the fuel gas flow path upstream of the control valve. A fan conveys the fuel gas-air mixture into or toward the gas burner. A differential pressure sensor is designed to acquire a pressure difference, referred to as offset pressure, between a measuring site along the fuel gas flow path and a measuring site along the air flow path.

Here, the ignition in the gas burner can occur only with an ignitable fuel gas-air mixture where the proportion of fuel gas is in a predetermine range. Thus, the fuel gas-air mixture is not too lean and not too rich.

However, misfires can occur in the boiler, in particular when hydrogen is used as fuel gas during the ignition.

The underlying aim of the disclosure is to overcome the aforementioned disadvantages and provide a method and a heating boiler that include a failsafe and lean ignition of a fuel gas-air mixture.

SUMMARY

This section provides a general summary of the disclosure, and is not a comprehensive disclosure of its full scope or all of its features.

In particular, an ignition that results in the formation of a flame and where the combustion is at the same time within established air ratio limits is understood to be safe. This is particularly important for the operation with 100% hydrogen as fuel gas or in general in the operation of boilers with fuels that have high flame speeds and short ignition delay times.

Therefore, a method is proposed for the failsafe and lean ignition of a fuel gas-air mixture on a gas burner. Thus, the method prevents ignitions in the case of undesired fuel gas-air mixtures. The fuel gas-air mixture is mixed using fuel gas and air in a mixing device arranged upstream of the gas burner. The fuel gas, that preferably includes at least in part and more preferably is entirely of hydrogen, flows along a fuel gas flow path into the mixing device. The air flows along an air flow path into the mixing device. Moreover, along the fuel gas flow path, a control valve is provided for the closed-loop control of a flow rate of the fuel gas flowing into the mixing device. The control valve comprises an actuator and a throttle element that can be moved by the actuator. Preferably, it throttles the flow of the fuel gas through the control valve depending on the position of the actuator by an interaction with a counter-element corresponding to the throttle element and thus controls the flow. According to the method, the actuator is moved into an actuator reference position in order to bring the throttle element into a throttle reference position. If the actuator is in the actuator reference position, it is tested whether the throttle element is in fact in the throttle reference position. This test of the throttle reference position can also be referred to as a plausibility test of the throttle reference position. Via the plausibility test, it can be ensured that only the desired quantity of fuel gas or the desired flow rate of the fuel gas in fact flows into the mixing device. Also, the resulting fuel gas-air mixture in fact has a desired mixing ratio of fuel gas and air. Subsequently, the method provides that the throttle element is moved by the actuator starting at a start time from the throttle reference position so that the flow rate is increased. Accordingly, an ignition device is activated to ignite the fuel gas-air mixture on the gas burner. In order to avoid misfires, the method additionally provides that the flow rate-increasing movement of the throttle element is stopped as soon as at least one of the following termination conditions occurs:

The actuator reaches a predetermined limit position that can also be referred to as an actuator position.

A differential pressure sensor acquires a predetermined limit pressure or threshold value, the sensor acquires a pressure difference, referred to as offset pressure, between a measuring site along the fuel gas flow path and a measuring site along the air flow path.

An ignition sensor, for detecting an ignition of the fuel gas-air mixture, detects an ignition of the fuel gas-air mixture.

Both the limit position of the actuator and the limit pressure or threshold value are preferably selected so that in the mixing device an ignitable fuel gas-air mixture, with a predetermined fuel gas proportion which does not exceed a predetermined and safe value, can be mixed.

The underlying idea of the method is to move the control valve, before an ignition, into a reference position where the flow through the control valve is minimized. Also, the reference position of the control valve or of the throttle element of the control valve undergoes a plausibility test. Subsequently, the flow rate through the control valve is increased until a failsafe and lean ignition in the gas burner occurs. In order to prevent ignition of an "excessively rich" mixture in the gas burner, the increase of the flow rate through the control valve is terminated or stopped as soon as one termination criterion among multiple possible termination criteria has been met.

Moreover, it can also be provided that at least one of the termination conditions must occur within a predetermined safety time. Also, the flow rate-increasing movement of the throttle element is stopped when none of the termination conditions occurs within the safety time.

In addition, the fuel gas-air mixture is preferably conveyed by a conveying device into the gas burner. Accordingly, a fan is arranged downstream of the mixing device (pre-fan-mixing) or along the air flow path upstream of the mixing device (post-fan-device).

According to an advantageous development, the flow rate of the fuel gas through the control valve in the throttle reference position will be or is minimized. In the throttle reference position, the flow rate of the fuel gas is reduced to a minimum by the throttle element. This is understood to mean that the minimized flow rate or the minimum is preferably selected so that a) the flow of the fuel gas through the control valve is completely blocked; or
b) a fuel gas flowing at the minimum flow rate into the mixing device results in a very lean but still ignitable fuel gas-air mixture or a very lean and non-ignitable fuel gas-air mixture.

The ignition device can be activated before the start time, at the start time or after the start time. By the activation of the ignition device before and/or at the start time, any possible moisture present on the ignition device can be eliminated. Thus, with an ignitable fuel gas-air mixture, a clean ignition can occur on the ignition device. Since at the start time itself there is still no ignitable fuel gas-air mixture present on the ignition device or in the gas burner, the ignition device can also be activated after the start time. Preferably, the ignition device is activated at the start time.

Here, the ignition device can be temporarily deactivated after an activation in order to eliminate the moisture and reactivated after or at the start time.

For the acquisition of the limit position or actuator position of the actuator, the actuator can, for example, comprise a measuring system designed for this purpose or can be designed as a step motor.

The control valve is preferably an electronic control valve. The throttle element, comprises, for example, a valve cone. The valve cone interacts with a valve or cone seat, as a counter-element, in order to throttle the flow rate. The throttle element can be moved or adjusted by an actuator, in particular a step motor, and the flow rate through the control valve can be set.

Preferably, along the fuel gas flow path, a safety valve is arranged upstream of the control valve. The safety valve can be switched between a blocking position, that blocks the fuel gas flow along the fuel gas flow path, and a passage or flow position, that allows fuel gas flow along the fuel gas flow path. If a safety valve is provided, it can be brought into the blocking position before the activation of the ignition device and into the flow position before the start time or at the start time. If reference is made to a safety valve below, it preferably refers to this type of safety valve.

With regard to the plausibility test of the throttle reference position, an advantageous development provides that, when the actuator is in the actuator reference position, the test as to whether the throttle element is in the throttle reference position includes the following steps:

a) A or the safety valve, arranged along the fuel gas flow path upstream of the control valve, is switched into its blocking position.
b) The actuator is moved into the actuator reference position in order to bring the throttle element into the throttle reference position.
c) The safety valve is switched into its flow position.
d) If an offset pressure acquired by the differential pressure sensor, within a predetermined testing time, does not increase above a test pressure limit value or if the offset pressure acquired by the differential pressure sensor, after an increase, decreases again within the testing time, the throttle element is in the throttle reference position.

Step d) can thus also be summarized to the effect that the offset pressure acquired by the differential pressure sensor is evaluated after step c) and, by the evaluation, it is determined whether the throttle element is in fact in the throttle reference position.

Moreover, it can conversely be concluded that throttle element is not in the throttle reference position if the offset pressure rises above the test pressure limit value within the testing time without falling again below it.

Such a plausibility test of the throttle reference position is particularly advantageous if the actuator is not "rigidly" connected to the throttle element but is instead connected to it, via a spring, which is very common in the prior art. In addition, and also in the case of a rigid connection, a defect of the actuator or of its measuring system for the acquisition of the actuator position can be ruled out by the plausibility test.

The plausibility test here is based on the idea that the pressure rises unacceptably rapidly in the case of an opened safety valve (in the feed-through position) and a control valve that is not in the reference position. Thus, if a pressure that increases unacceptably rapidly within the testing time is acquired by the pressure sensor, the control valve is not in the reference position.

It should be noted here that, during the opening of the safety valve or a switching from the blocked position into the feed-through position, the throttle element of the control valve can move and generate a brief pressure surge. If, due to the design, such a pressure surge is generated by the control valve, this can be taken into account in that the test pressure limit value is selected to be greater than the amplitude of the pressure surge or in that it is tested whether the pressure falls again within the testing time after an increase due to the pressure surge.

Furthermore, it can be provided that, according to the method, a safe or failsafe and lean ignition is detected if, after the start time and/or the opening of the safety valve, the ignition sensor detects an ignition within a or the predetermined safety time. Alternatively or additionally, it can be provided that if, after the start time and/or the opening of the safety valve, the ignition sensor does not detect the ignition within the predetermined safety time, an unsafe state or a faulty ignition is detected.

The unsafe state can optionally also be assumed or detected if the throttle element is not in the throttle reference position according to the plausibility test.

When the unsafe state or the faulty ignition is detected, the throttle element can be brought into the throttle reference position and/or a or the safety valve, arranged along the fuel gas flow path upstream of the control valve, can be brought into its blocked position and/or the ignition device can be deactivated.

If a safe ignition has been detected, it can subsequently be provided that, after the detection of the safe ignition and/or after a predetermined stabilization time, a control device actuates the control valve depending on the offset pressure in order to reach a predetermined offset pressure target value which is preferably 0 Pa (zero pressure control).

Furthermore, during the movement of the throttle element, after the start time, the flow rate is preferably increased in a predetermined steady course. In particular, it is selected so that the predetermined limit position and/or the predetermined limit pressure can be reached before the expiration of the safety time.

The differential pressure sensor is designed to directly acquire the pressure difference between the measuring site along the fuel gas flow path and the measuring site along the air flow path.

Alternatively, the pressures are acquired separately at the two measuring sites. Thus, the difference between the two is calculated. However, this often leads to relatively imprecise results in comparison to the direct acquisition of the pressure difference.

Moreover, the differential pressure sensor can be designed as a thermal mass flow sensor. The thermal mass flow sensor is designed to determine the pressure difference from a mass flow between the measuring site along the fuel gas flow path and the measuring site along the air flow path. Here, the offset pressure is determined from the acquired mass flow and a previously known flow cross section.

The ignition senor is preferably a flame sensor for detecting a flame on a gas burner. The flame sensor detects the ignition by detecting the flame. Additionally or alternatively, the ignition sensor can be the differential pressure sensor or can be integrally formed by the differential pressure sensor, which acquires the ignition via a temporary increase of the offset pressure.

Here, the temporary increase of the offset pressure or a pressure surge can have a predetermined course and/or a predetermined duration. Thus, the ignition can be acquired by the evaluation of the pressure or pressure course acquired by the differential pressure sensor.

In a variant of the control valve, the throttle element is a valve cone. In the throttle reference position, it is moved, via spring-loading, onto a valve seat of the control valve corresponding to the valve cone. The valve cone is moved generating a pressure surge due to the changing pressure conditions when the safety valve is switched into the flow position. Here, according to the method, it is provided that the switching of the safety valve into the flow position is detected if such an increase of the offset pressure, a pressure surge, is acquired by the differential pressure sensor immediately after the switching of the safety valve.

Correspondingly, by such an evaluation, a plausibility test of the operability of the safety valve can take place. This plausibility test of the operability of the safety valve occurs preferably integrally with the plausibility test of the throttle reference position.

If it is detected that the safety valve does not switch as intended, an error can be detected and corresponding additional steps can be initiated. For example, if the safety valve is currentless, it is closed by a spring in the prior art in order to prevent an unsafe state. Here, usually two safety valves are incorporated in order to increase the safety. If the safety valve is currentless in spite of the signal for opening, that is to say if it is not switched as intended, no gas flows and the offset pressure signal does not change as expected. In this way, an error can be detected (for example, cable not connected).

Another aspect of the disclosure relates to a heating boiler with a gas burner for combustion of the fuel gas-air mixture. A mixing device is arranged upstream of the gas burner for mixing a fuel gas flowing in along a fuel gas flow path and air flowing in along an air flow path to form the fuel gas-air mixture. Furthermore, the heating boiler comprises a conveying device for conveying the fuel gas-air mixture to the gas burner. The conveying device is arranged downstream of the mixing device or along the air flow path upstream of the mixing device. A control valve is arranged along the fuel gas flow path. A main quantity throttle is arranged along the fuel gas flow path between the control valve and the mixing device. The control valve, in particular, an electronic control valve, has an actuator and a throttle element that can be moved by the actuator for the closed-loop control of a flow rate of the fuel gas flow along the fuel gas flow path into the mixing device. Moreover, the heating boiler has a safety valve arranged along the fuel gas flow path upstream of the control valve. A differential pressure sensor is designed to acquire a pressure difference, referred to as offset pressure, between a measuring site along the fuel gas flow path and a measuring site along the air flow path. The measuring site along the fuel gas flow path is preferably situated between the control valve and the main quantity throttle. Furthermore, the heating boiler comprises a control unit that can include the aforementioned closed-loop control device. The heating boiler is designed to carry out the method according to the disclosure for the failsafe and lean ignition of the fuel gas-air mixture.

The above disclosed features can be combined as desired, to the extent that this is technically possible and to the extent that the features are not mutually contradictory.

Further areas of applicability will become apparent from the description provided herein. The description and specific examples in this summary are intended for purposes of illustration only and are not intended to limit the scope of the present disclosure.

BRIEF DESCRIPTION OF DRAWINGS

Other advantageous developments of the disclosure are illustrated in the dependent claims or are described in more detail below together with the description of the preferred embodiment of the disclosure with reference to the figures.

DETAILED DESCRIPTION

Figure 1:
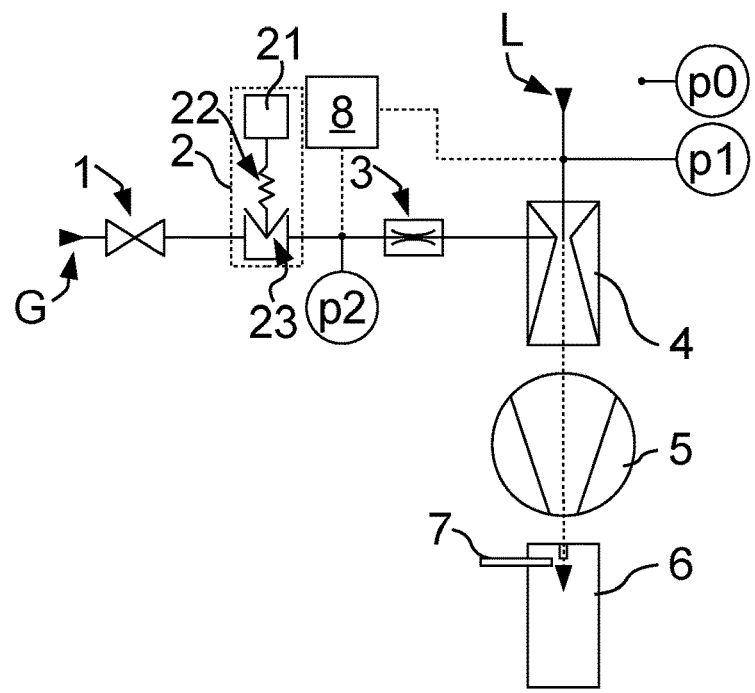
FIG. 1 is an exemplary diagrammatic view of a heating boiler.

The figures are diagrammatic examples. Identical reference numerals in the figures indicate identical functional and/or structural features.

FIG. 1 diagrammatically shows a portion or a section of a gas or heating boiler according to the disclosure. Mixing device 4, a Venturi mixer, suctions air along an air flow path through an air inlet L by a conveying device 5, designed as fan 5. In the mixing device 4, the inflowing air and a fuel gas which flows in along a fuel gas flow path through a fuel gas inlet G are mixed to form a fuel gas-air mixture.

The fuel gas, which is in particular pure hydrogen, flows along the fuel gas flow path through a safety valve 1, a control valve 2, for the closed-loop control of a flow rate of the fuel gas flowing into the mixing device 4, and a main quantity throttle 3. By means of the closed-loop control of the flow rate of the fuel gas though the control valve 2, the mixing ratio of the fuel gas-air mixture, i.e., the proportion of the fuel gas in the fuel gas-air mixture, can be set.

Moreover, at least one differential pressure sensor 8 is provided. It is designed to acquire a pressure difference, referred to as offset pressure, between a measuring site p2, along the fuel gas flow path, and a measuring site p1, p0 along the air flow path. The measuring site p2, along the fuel gas flow path, is preferably arranged between the control valve 2 and the main quantity throttle 3. The measuring site, along the air flow path, can be provided, for example, between upstream of the mixing device 4 and downstream of the air inlet L (measuring site p1) or downstream of the air inlet L (measuring site p0).

The fuel gas-air mixture is conveyed by the fan 5 to a gas burner 6 of the heating boiler, where the fuel gas-air mixture is intended to be ignited and burned. To this effect, on the gas burner 6, an ignition device 7, for igniting an ignitable fuel gas-air mixture, is provided. In the present case, the fan 5 is arranged downstream of the mixing device 4, but alternatively it can also be arranged upstream of the mixing device 4.

The control valve 2 comprises an actuator 21 which in the present case is implemented as a step motor. The actuator is designed to move a throttle element 23 of the control valve 2. The throttle element is designed as valve cone 23. The throttle element 23 interacts with a counter-element designed as a valve seat corresponding to the valve cone 23. Thus, the flow of the fuel gas through the control valve can be controlled. Here, the actuator 21 is connected via a spring 22 to the throttle element 23. For example, as a result of a defect of the actuator 21, a defect of the measuring system for the acquisition of the position of the actuator 21 or due to jamming or breaking of the spring 22, it can occur that the position of the actuator 21 does not correspond to the position of the throttle element 23.

Thus, if such a defect or another defect is present, it can occur that the throttle element 23 is not in the throttle reference position when the actuator 21 is in the actuator reference position or if it is assumed that the actuator 21 is in the actuator reference position.

If such a defect or another defect is present, a misfire can occur during the ignition of the fuel gas-air mixture. This is due to the actually present fuel gas-air mixture does not correspond to the assumed or desired fuel gas-air mixture.

Figure 2:
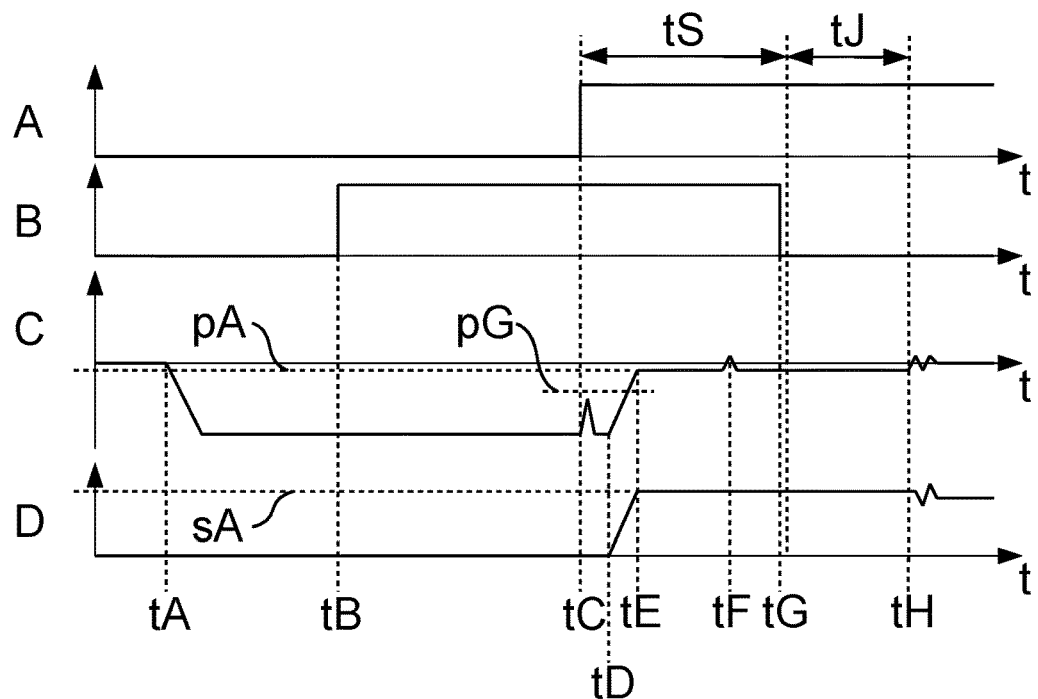
FIG. 2 is a diagrammatic view showing states and measuring values during the implementation of the method.

FIG. 2 diagrammatically shows various states and measurement values of the components of the heating boiler, which result from the procedure of the method according to the disclosure.

Graph A shows the state of the safety valve 1. Graph B shows the state of the ignition device 7. Graph C shows the pressure difference or the offset pressure measured by the differential pressure sensor 8. Graph D shows the step motor position or a value corresponding to it and therefore the position of the actuator 21 of the control valve 2 and thus the flow rate corresponding thereto of the fuel gas through the control valve 2.

At time tA, the fan 5 is activated so that an underpressure at the measuring site p2 is acquired by the differential pressure sensor 8 due to the closed safety valve 1. Thus, the safety valve 1 in its blocked position.

At time tB, the ignition device 7 is activated.

In the present case, the actuator 21 of the control valve 2 has already been moved into the actuator reference position where the flow rate through the control valve 2, according to graph D, is reduced to 0. However, the movement of the actuator 21 of the control valve 2 into the actuator reference position can also occur later and up to time tC.

In order to be able to ensure a particularly failsafe and lean ignition, a test or plausibility test is then performed according to the method represented as an example to determine whether the throttle element 23 has in fact been brought into the throttle reference position by the movement of the actuator 21 into the actuator reference.

To this effect, the safety valve 1 at time tC is opened or brought into its feed-through position.

If the throttle element 23 is in the throttle reference position where the flow through the control valve is minimized, no unacceptable change of the offset pressure should be acquired by the differential pressure sensor 8.

If the actuator 21 is connected by a spring 22 to the throttle element 23, due to the spring loading, a brief "lifting" of the throttle element 23 and therefore a brief pressure surge can occur, which—as represented in FIG. 2—is acquired by the differential pressure sensor 8. Such a pressure surge thus is an acceptable change of the offset pressure, which can be taken into account, for example, in that the test pressure limit value pG, above which the offset pressure must not rise, is selected so that the expected pressure surge is below it. Alternatively, a test can be carried out to determine whether the offset pressure, if the test pressure limit value pG is exceeded due to the pressure surge, subsequently falls again below the test pressure limit value pG.

The time period between times tC and tD in the present case corresponds to the testing time when a plausibility test is performed to determine whether the throttle element 23 is in fact in the throttle reference position.

Since the offset pressure acquired by the differential pressure sensor 8 within the predetermined testing time (time interval between the times tC and tD) does not rise above the test pressure limit value pG, the throttle element 23 is in the throttle reference position.

The throttle reference position has therefore undergone a plausibility test and no error is present so that the method is continued.

At the start time tD, the opening of the control valve 2, according to the predetermined steady and here ramp-like course, is started so that the flow rate through the control valve 2 as represented in graph D is increased. The fuel gas-air mixture generated by the mixing device 4 is mixed with a steadily increasing fuel or fuel gas proportion and becomes "richer."

However, starting at start time tD, the control valve 2 is not further opened for an arbitrarily long time but rather only until one of multiple possible termination criteria is detected. The termination criteria are the reaching of a limit position (sA) by the actuator 21, the reaching or acquisition of a limit pressure (pA) by the differential pressure sensor 8, or the detection of an ignition of the fuel gas-air mixture by an ignition sensor. The ignition sensor is formed, for example, by a flame sensor for the detection of the flame on the gas burner 6 or integrally by the differential pressure sensor 8.

In the present case, it is represented, as an example, that the limit position sA and the limit pressure pA are reached at the same time at time tE and an opening or adjustment of the control valve 2 is terminated. However, limit position sA and limit pressure pA do not have to be reached at the same time. Instead, it is provided that the opening of the control valve 2 is terminated or stopped as soon as one of the limit values is reached or an ignition is detected.

As described, at time tE the opening of the control valve 2 is stopped and the control valve 2 remains at least initially in its position.

In order to be able to assume a safe ignition, starting at time tC of the opening of the safety valve 1 and within the safety time tS, an ignition sensor must detect a flame formation on the gas burner, i.e. an ignition of the fuel gas-air mixture.

In the present case, it is provided that the differential pressure sensor 8 is at the same time the ignition sensor. At time tF, a pressure surge that was generated by the ignition of the fuel gas-air mixture on the gas burner 6 is detected by the differential pressure sensor 8.

After the successful ignition detected at time tF, and here at time tG, the ignition device 7 is deactivated.

Moreover, after the detection of the successful ignition at time tF, immediately or after a stabilization time tJ, for the stabilization of the combustion, and, in the present case, at time tH, the control valve 2 can be adjusted to a desired or predetermined offset pressure.

The disclosure is not limited in its embodiment to the aforementioned preferred embodiments. Instead, a number of variants are conceivable, which use the represented solution even in embodiments of a fundamentally different type.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for a failsafe and lean ignition of a fuel gas-air mixture on a gas burner, which is mixed in a mixing device arranged upstream of the gas burner using a fuel gas flowing in along a fuel gas flow path and air flowing in along an air flow path, a control valve provided along the fuel gas flow path comprises an actuator and a throttle element that can be moved by the actuator for a closed-loop control of a flow rate of the fuel gas flowing into the mixing device, the method comprising:

moving the actuator into an actuator reference position;
    bringing the throttle element into a throttle reference position;
    performing a test to determine whether the throttle element is in the throttle reference position when the actuator is in the actuator reference position;
    moving the throttle element by the actuator in a flow rate-increasing manner starting at a start time (tD) from the throttle reference position;
    activating an ignition device for the ignition of the fuel gas-air mixture on the gas burner; and
    stopping the flow rate-increasing movement of the throttle element as soon as at least one of the following termination conditions occurs:
      the actuator reaches a predetermined limit position (sA);
      a differential pressure sensor for the acquisition of a pressure difference, referred to as offset pressure, between a measuring site along the fuel gas flow path and a measuring site along the air flow path acquires a predetermined limit pressure (pA);
      an ignition sensor for detecting an ignition of the fuel gas-air mixture detects an ignition of the fuel gas-air mixture.

2. The method according to claim 1, further comprising minimizing the flow rate of the fuel gas through the control valve in the throttle reference position.

3. The method according to claim 1, further comprising determining whether the throttle element is in the throttle reference position when the actuator is in the actuator reference position includes the following steps:
    a) switching a safety valve, arranged along the fuel gas flow path upstream of the control valve, into its blocking position;
    b) moving the actuator into the actuator reference position in order to bring the throttle element into the throttle reference position;
    c) switching the safety valve into its flow position;
    d) the throttle element is in the throttle reference position if an offset pressure acquired by the differential pressure sensor within a predetermined testing time does not increase above a test pressure limit value (pG) or if the offset pressure acquired by the differential pressure sensor, after an increase, decreases again within the testing time.

4. The method according to claim 1, further comprising:
    detecting a safe ignition if, after the start time (tD) and/or the time (tC) of the opening of the safety valve, an ignition sensor detects an ignition within a predetermined safety time (tS),
    and/or detecting an unsafe state if, after the start time (tD) and/or the time (tC) of the opening of the safety valve, the ignition sensor does not detect the ignition within the predetermined safety time (tS).

5. The method according to claim 4, wherein, when the unsafe state is detected, bringing the throttle element into the throttle reference position and/or bringing a safety valve arranged along the fuel gas flow path upstream of the control valve into its blocked position and/or deactivating the ignition device.

6. The method according to claim 4, wherein after the detection of the safe ignition and/or after a predetermined stabilization time, a control device actuates the control valve depending on the offset pressure in order to reach a predetermined offset pressure target value.

7. The method according to claim 1, wherein, during the movement of the throttle element, after the start time (tD), increasing the flow rate in a predetermined steady course.

8. The method according to claim 1, wherein the differential pressure sensor is designed to directly acquire the pressure difference between the measuring site along the fuel gas flow path and the measuring site along the air flow path,
    or wherein the differential pressure sensor is a thermal mass flow sensor which is designed to determine the pressure difference from a mass flow between the measuring site along the fuel gas flow path and the measuring site along the air flow path.

9. The method according to claim 1,
    wherein the ignition senor is a flame sensor for detecting a flame on the gas burner, the flame sensor detects the ignition by detecting the flame,
    and/or the ignition sensor is the differential pressure sensor detecting the ignition via a temporary increase of the offset pressure.

10. The method according to claim 1,
    wherein the fuel gas is at least in part and in particular entirely of hydrogen.

11. The method according to claim 3,
    wherein the throttle element is a valve cone which, in the throttle reference position, is moved, via spring-loading, onto a valve seat of the control valve corresponding to the valve cone,
    the valve cone is moved generating a pressure surge when the safety valve is switched into the flow position,
    and the switching of the safety valve into the flow position is detected if the increase of the offset pressure is acquired by the differential pressure sensor.

12. A heating boiler with a gas burner for combustion of a fuel gas-air mixture, comprising:

a mixing device arranged upstream of the gas burner for mixing a fuel gas flowing in along a fuel gas flow path and air flowing in along an air flow path to form the fuel gas-air mixture;

a conveying device for conveying the fuel gas-air mixture to the gas burner, the conveying device arranged downstream of the mixing device or along the air flow path upstream of the mixing device;

a control valve arranged along the fuel gas flow path, the control valve having an actuator and a throttle element which can be moved by the actuator for the closed-loop control of a flow rate of the fuel gas flowing into the mixing device;

a main quantity throttle arranged along the fuel gas flow path between the control valve and the mixing device;

a safety valve arranged along the fuel gas flow path upstream of the control valve;

a differential pressure sensor designed to acquire a pressure difference, be referred to as offset pressure, between a measuring site along the fuel gas flow path and a measuring site along the air flow path; and a control unit designed to carry out a method for a failsafe and lean ignition of the fuel gas-air mixture according to claim 1.

* * * * *